(12) United States Patent
Isogai et al.

(10) Patent No.: US 6,304,713 B1
(45) Date of Patent: Oct. 16, 2001

(54) OPTICAL FIBER SEAL VERIFYING SYSTEM

(75) Inventors: Takeshi Isogai, Hyogo-ken; Michio Wakahara, Tokyo; Youichi Yamamoto, Ibaraki-ken, all of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/261,854

(22) Filed: Mar. 3, 1999

(30) Foreign Application Priority Data

Mar. 5, 1998 (JP) .................................................. 10-053482

(51) Int. Cl.$^7$ ....................................................... G02B 6/00
(52) U.S. Cl. ............................... 385/147; 385/115; 349/2; 250/227.15
(58) Field of Search ..................................... 385/147, 115; 250/227.15; 700/83; 273/348; 349/2

(56) References Cited

U.S. PATENT DOCUMENTS

| | | | |
|---|---|---|---|
| 4,106,849 | * | 8/1978 | Stieff ..................................... 385/115 |
| 4,130,341 | * | 12/1978 | Stieff ..................................... 385/115 |
| 4,447,123 | | 5/1984 | Page et al. ............................. 385/115 |

OTHER PUBLICATIONS

M.D. Bronson, et al., "Computer Assisted In Situ Verification of The COBRA Seal", *International Nuclear Safeguards 1994* vol. 2, pp. 235–240 (Exhibit B).

"COBRA Seal System II" Department of Safeguards, International Atomic Energy Agency, SG–C/S–02 REV 0 Sep., 1992. (Exhibit C).

* cited by examiner

*Primary Examiner*—Phan T. H. Palmer
(74) *Attorney, Agent, or Firm*—John P. White; Cooper & Dunham LLP (57) ABSTRACT

An optical fiber seal verifying system includes an optical pattern generation unit for reading the optical pattern of an optical fiber seal in sealing and verification and generating first and second optical pattern data corresponding to the sealing and verification, respectively, a seal number input unit for inputting a unique seal number for identifying the optical fiber seal, a memory unit for recording the optical pattern data generated by the optical pattern generation unit together with the seal number input by the seal number input unit, a processor unit for reading the first optical pattern data recorded in the memory unit in verifying the optical fiber seal and the second optical pattern data recorded in the memory unit in sealing the optical fiber seal corresponding to the seal number on the basis of the seal number recorded in the memory unit and comparing the first and second optical pattern data with each other to calculate the concordance ratio, and a display unit for displaying the calculation result from the processor unit.

28 Claims, 8 Drawing Sheets

PICKED UP IMAGE OF OPTICAL
FIBER SEAL END FACE

OPTICAL FIBER SEAL VERIFYING SYSTEM

BACKGROUND OF THE INVENTION

This application is based on Japanese Patent Application No. 10-53482, filed Mar. 5, 1998, the content of which is cited herein by reference.

The present invention relates to an optical fiber seal verifying system used to probate an optical fiber seal.

In nuclear facilities, to comply with the NTP safeguards agreement based on the NTP (Nuclear Nonproliferation Treaty), many seals are used for the purpose of checking whether nuclear substances are illicitly taken out from storage facilities or casks. Judging whether seals have been tampered with is called "verification".

There are seals of various types, and currently, E type metal cap seals are widely used. However, as the first problem, the E type metal cap seals must be detached for verification to check the presence/absence of abnormalities. As the second problem, one to two weeks are required for verification.

To solve these problems, an optical fiber seal (also called a COBRA seal) has been developed by Sandia National Laboratories in USA.

The optical pattern of optical fiber transmission light on the seal end face is photographed in sealing and verification, and the two photographs are visually compared, thereby verifying an optical fiber seal.

By comparing the optical pattern photographed in sealing with the optical pattern photographed in verification, the presence/absence of seal break is determined. To do this, the optical patterns are recorded by photographing them, and the optical pattern in sealing and that in verification are visually compared and collated.

In this method, however, the load on the person who performs verification is heavy. In addition, the determination result cannot be quantified and contains the subjective point of view of the inspector.

BRIEF SUMMARY OF THE INVENTION

It is an object of the present invention to provide an optical fiber seal verifying system capable of obtaining a determination result quantified at the verifying site.

According to the first aspect of the present invention, there is provided an optical fiber seal verifying system comprising an optical pattern generation unit for reading an optical pattern of an optical fiber seal in sealing and verification and generating first and second optical pattern data corresponding to the sealing and verification, respectively, a seal number input unit for inputting a unique seal number for identifying the optical fiber seal, a memory unit for recording the optical pattern data generated by the optical pattern generation unit together with the seal number input by the seal number input unit, a processor unit for reading the first optical pattern data recorded in the memory unit in verifying the optical fiber seal and the second optical pattern data recorded in the memory unit in sealing the optical fiber seal corresponding to the seal number on the basis of the seal number recorded in the memory unit and comparing the optical pattern data with each other to calculate a concordance ratio and a display unit for displaying a calculation result from the processor unit.

According to this arrangement, the optical pattern of an optical fiber seal is recorded in sealing. In verification, an optical pattern read from an optical fiber seal to be probated is compared to the optical pattern recorded in sealing to obtain the concordance ratio, thereby verifying the optical fiber seal.

As the inspector need not compare photographs for verification, the operation load on the inspector is largely reduced. Additionally, the verifying result is not influenced by the subjective point of view of the inspector.

According to the second aspect of the present invention, there is provided an optical fiber seal verifying system similar to the system according to the first aspect, which further comprises a portable case and a power supply unit. The power supply unit is accommodated in the portable case, along with the optical pattern generation unit, seal number input unit, memory unit, processor unit and display unit.

According to this arrangement, not only the effect obtained by the system of the first aspect of the present invention but also the following effect can be obtained.

Since the optical fiber seal verifying system of the present invention is portable, a verifying result can be obtained at the verifying site.

According to the third aspect of the present invention, the optical pattern generation unit of the second aspect comprises a holder for holding the optical fiber seal in which two end portions of an optical fiber bundle are fixed, a light-emitting device for sending light from one end face of the optical fiber bundle, and an image pickup device for picking up optical patterns of the optical fiber seal held by the holder and the seal number carved near an end portion of the optical fiber seal.

With this arrangement, the end face image of the optical fiber seal can be appropriately picked up.

According to the fourth aspect of the present invention, the holder of the third aspect comprises an insertion portion for receiving the optical fiber seal, a fixing spring for fixing the optical fiber seal inserted into the insertion portion, and a limit switch for detecting that the optical fiber seal is inserted to a position that allows picking up images.

With this arrangement, the end face image of the optical fiber seal can be properly picked up, and any end faces' images can be picked up under the same condition.

According to the fifth aspect of the present invention, the optical pattern generation unit of the first aspect comprises an analog/digital converter for converting the optical patterns picked up by the image pick up device into multivalued digital data, and an image memory unit for storing the digital data converted by the analog/digital converter.

With this arrangement, optical pattern processing can be easily performed by the processor unit.

According to the sixth aspect of the present invention, a processor unit identical to the one according to the fourth aspect calculates the number of luminous points and luminance distribution in two optical patterns of an optical fiber, which are represented by digital data generated by the analog/digital converter. The first optical pattern is one the fiber has while probated, and the second optical pattern is one the fiber has while being sealed. From the number of luminous points and luminance distribution, the processor unit determines the positions which the two optical pattern should take to have the greatest number of luminous points in common, and calculates a ratio of the number of luminous points which each pattern has in common with the to the other pattern to the number of other luminous points which the pattern has.

With this arrangement, matching between the optical patterns in verification and sealing can be quantitatively evaluated.

According to the seventh aspect of the present invention, the processor unit of the sixth aspect calculates the concordance ratio by $$S/(N1+N2-S)$$

where N1 is the number of luminous points of a first optical pattern of the optical fiber seal in sealing, N2 is the number of luminous points of a second optical pattern of the optical fiber seal in verification, and S is the number of luminous points at which the first and second optical patterns match.

With this arrangement, matching between the optical patterns in verification and sealing can be quantitatively evaluated.

According to the eighth aspect of the present invention, when the concordance ratio is equal to or higher than a predetermined value, the processor unit of the seventh aspect determines that the optical fiber seals are identical, and when the concordance ratio is lower than the predetermined value, the processor unit determines that the optical fiber seals are different, or the optical fiber seal has been broken.

With this arrangement, verification determination standards in the optical fiber seal verifying operation can be unified.

According to the ninth aspect of the present invention, the optical pattern generation unit of the fifth aspect performs pattern matching evaluation of optical patterns of optical fiber seals in sealing and verification, which are converted into digital data by the analog/digital converter, when the optical patterns match, determines that the optical fiber seals are identical, and when the optical patterns do not match, determines that the optical fiber seals are different, or the optical fiber seal has been broken.

With this arrangement, matching between the optical patterns in verification and sealing can be quantitatively evaluated.

According to the 10th aspect of the present invention, the optical pattern generation unit of the first aspect reads the optical pattern of the seal number and inputs the optical pattern to the seal number input unit, and the seal number input unit performs character recognition processing of the input optical pattern to recognize the seal number.

With this arrangement, the seal number need not be input in verification, so it is laborsaving for the inspector.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrated presently preferred embodiments of the present invention and, together with the general description given above and the detailed description of the preferred embodiments given below, serve to explain the principles of the present invention.

DETAILED DESCRIPTION OF THE INVENTION

An embodiment of the present invention will be described below with reference to the accompanying drawing.

Figure 5A:
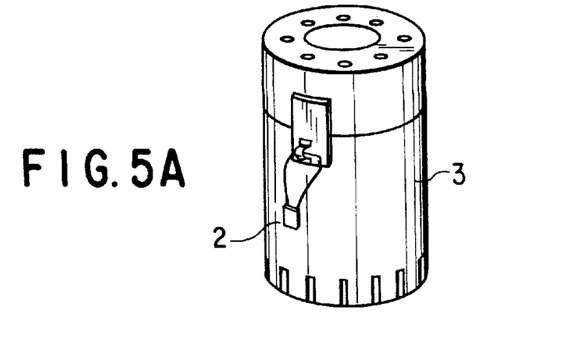
FIGS. 5A, 5B, and 5C are perspective views for explaining the structure of an optical fiber seal.
Figure 5B:
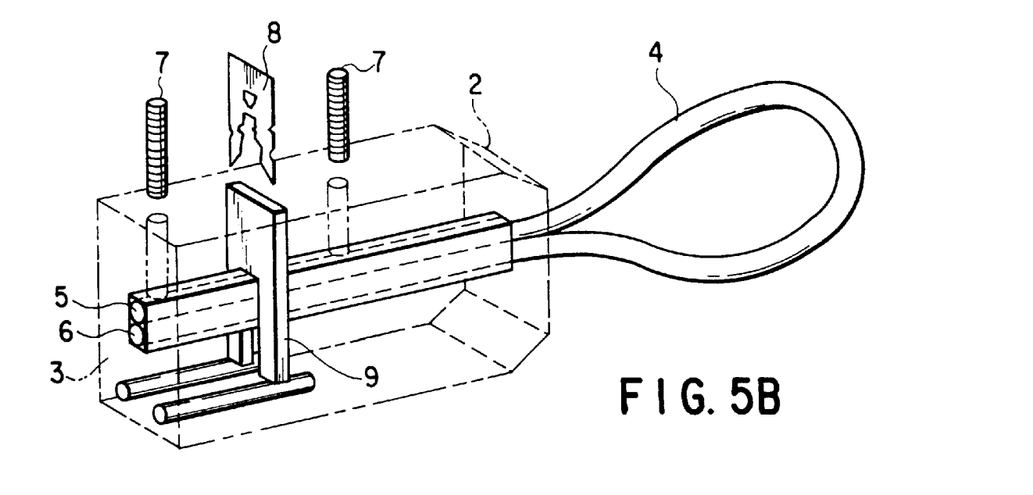
Figure 5C:
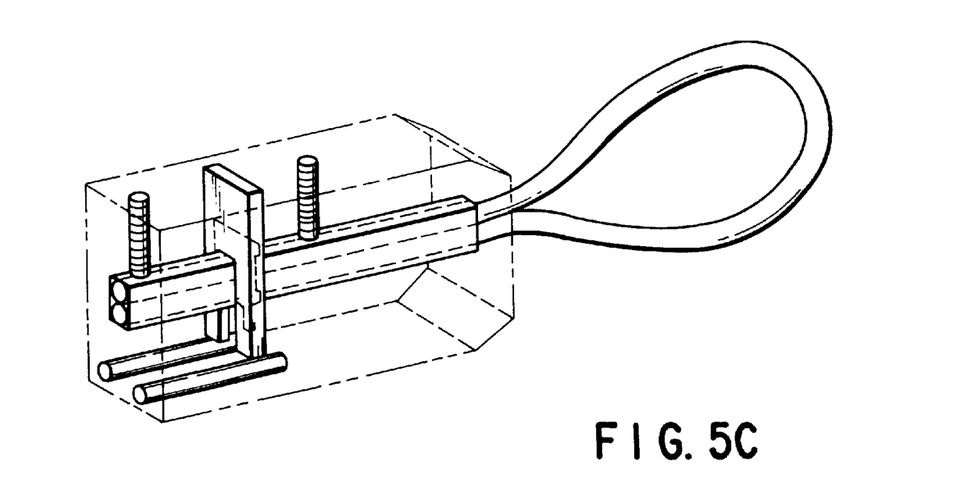

An optical fiber seal is used in a form shown in FIG. 5A, and comprises an optical fiber bundle 4 and a seal main body 2, as shown in FIGS. 5B and 5C. The optical fiber bundle 4 has an outer diameter of 3.3 mm and is formed by covering 64 plastic optical fibers each having a diameter of 254 $\mu$m with a polyethylene sheath.

In an optical fiber seal, the optical fiber bundle 4 is inserted into the seal main body 2, and a cutter 8 is inserted along a cutter guide 9 to cut some optical fibers in the seal main body 2. At the same time, assembly pins 7 are inserted into the seal main body 2 to firmly fix the optical fiber bundle 4 in the seal main body 2.

When a seal end face 3 is irradiated with light, the light incident on one end portion 5 of the optical fiber bundle 4 emerges from the other end portion 6 through the optical fiber which is not cut and forms luminous points (bright points). The optical pattern of the set of luminous points is unique to each seal, like fingerprints, because the optical fibers have a twist and some optical fibers are cut upon assembly.

Figure 6:
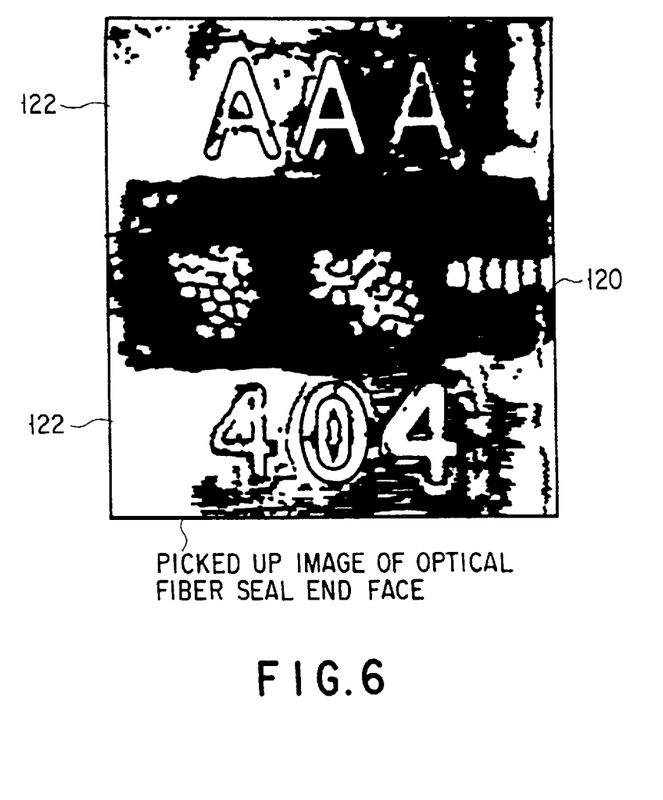
FIG. 6 is a view showing an example of the picked up image of an optical fiber seal end face for optical fiber seal verification.

FIG. 6 shows an example of the optical pattern. Referring to FIG. 6, an optical pattern 120 appears at the center. A combination of alphabets and numbers on the upper and lower sides of the optical pattern 120 is a seal number 122 carved in the seal end face 3 to identify the optical fiber seal 2.

When the optical fiber bundle 4 is cut or the seal main body 2 is disassembled, the optical pattern 120 of the optical fiber seal cannot be reproduced any more. Hence, if the seal has been broken, it can be determined that the optical pattern has changed from the form it had at the time of sealing.

Figure 1:
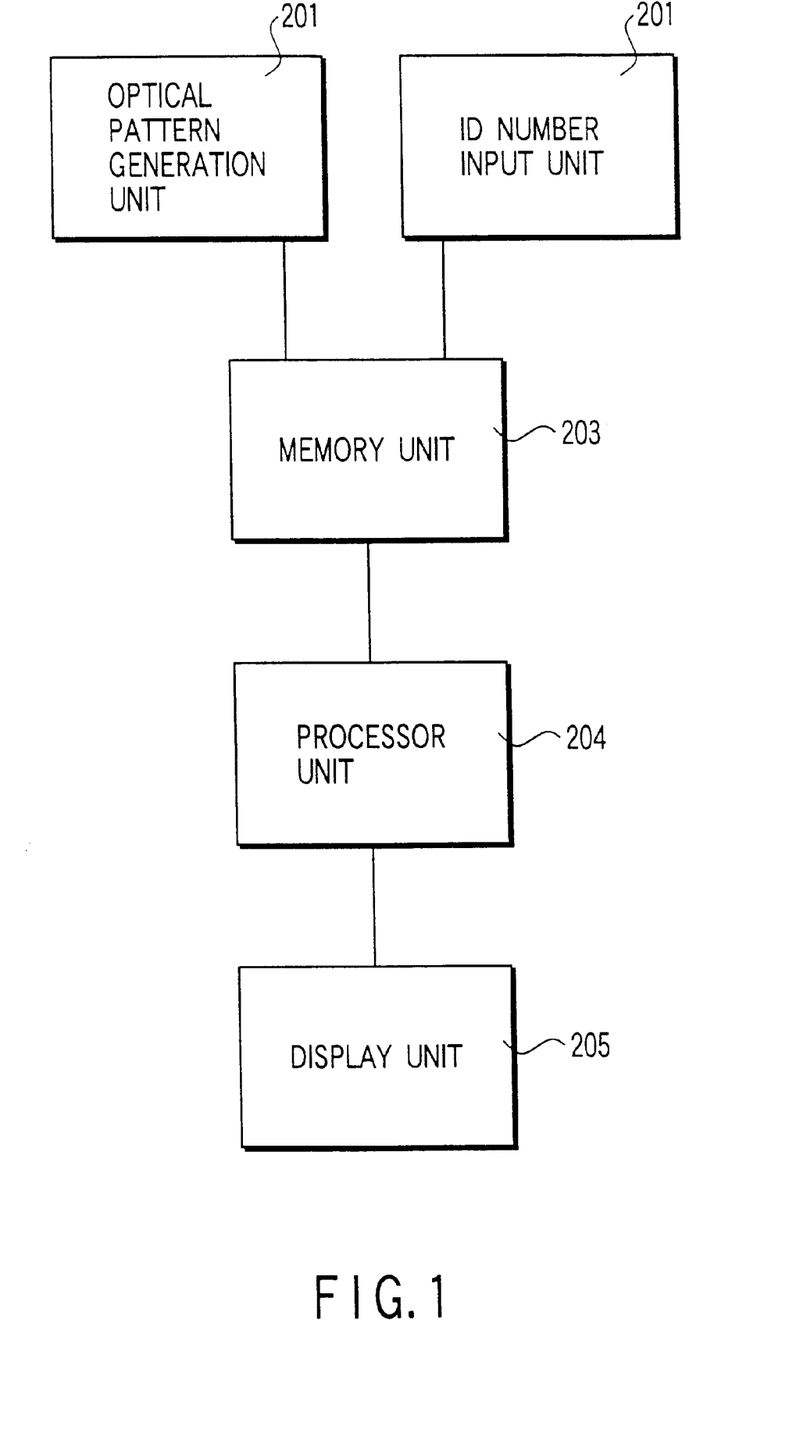
FIG. 1 is a block diagram showing the basic arrangement of an optical fiber seal verifying system of the present invention.

As shown in FIG. 1, an optical fiber seal verifying system main unit 1 according to the present invention comprises an optical pattern generation unit 201, a seal number input unit 202, a memory unit 203, a processor unit 204, and a display unit 205.

The optical pattern generation unit 201 reads the optical pattern 120 of an optical fiber seal in sealing and verification and generates optical pattern data representing the optical pattern. A seal number is input to the seal number input unit 202.

The memory unit 203 records the optical pattern data generated by the optical pattern generation unit 201 and the seal number input from the seal number input unit 202.

On the basis of the seal number recorded in the memory unit 203, the processor unit 204 receives the optical pattern data recorded in the memory unit 203 in verifying the optical fiber seal and the optical pattern data recorded in the memory unit 203 in sealing optical fiber corresponding to the seal number, and compares the two optical pattern data to calculate the concordance ratio.

The display unit 205 displays the calculation result from the processor unit 204.

Figure 2:
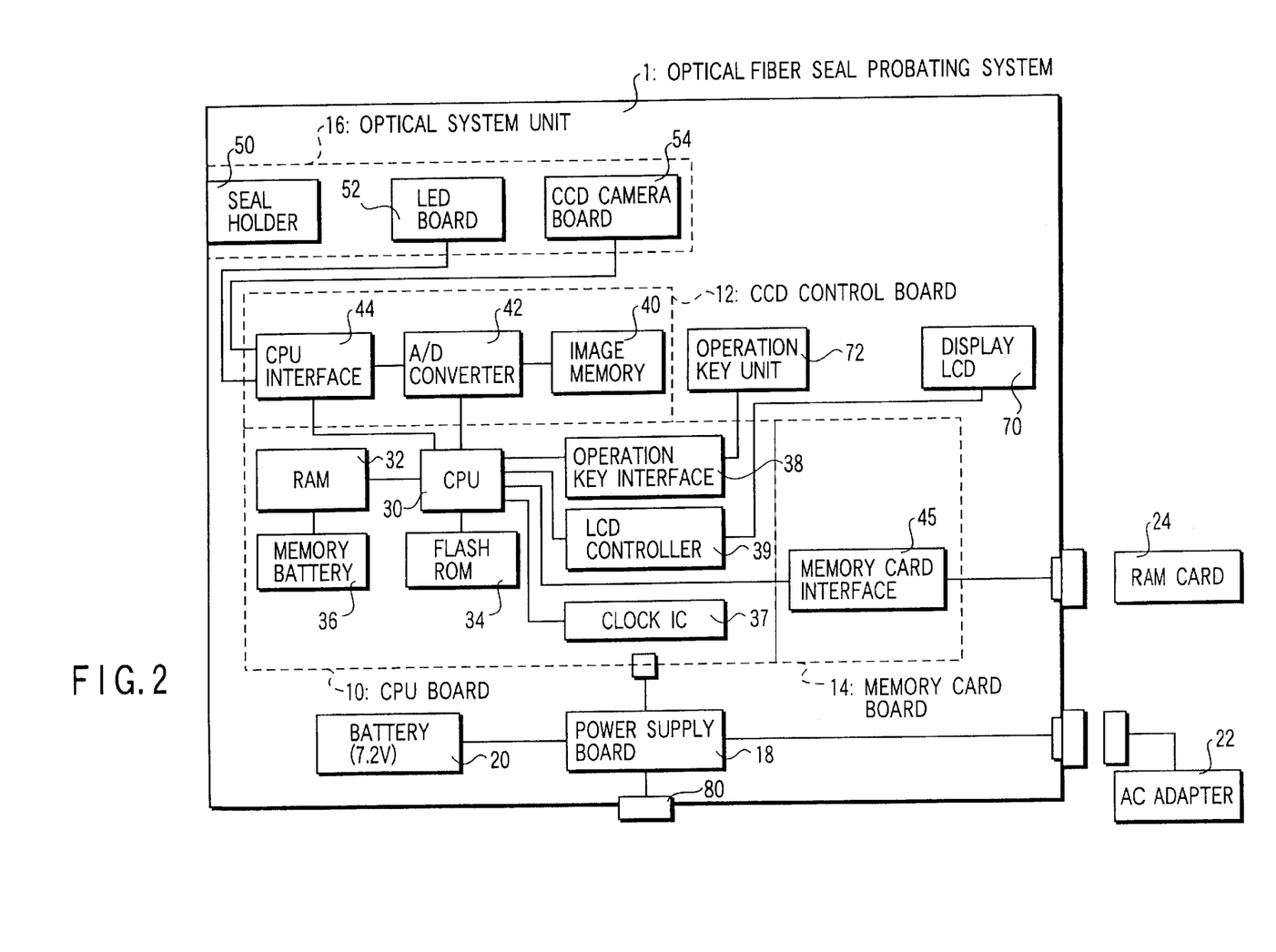
FIG. 2 is a block diagram showing a specific example of the system function configuration of the optical fiber seal verifying system according to an embodiment of the present invention.

A specific embodiment of the optical fiber seal verifying system with this arrangement will be described with reference to FIG. 2. The optical fiber seal verifying system main unit 1 of this embodiment is constructed by integrating a CPU board 10, a CCD control board 12, a memory card board 14, an optical system unit 16, a power supply board 18, and a battery 20. An AC adapter 22 independent of the main unit 1 is connected to the main unit 1 as needed. A RAM card 24 is a detachable portable recording medium which is inserted into the optical fiber seal verifying system main unit 1, as needed, to hold data acquired in sealing or verifying the optical fiber seal.

The CPU board 10 is the main functional section of the optical fiber seal verifying system 1 and has a CPU 30, a RAM 32, a flash ROM 34, a memory battery 36, a clock IC 37, an operation key interface 38, and an LCD controller 39.

The CPU (Central Processing Unit) 30 controls the entire optical fiber seal verifying system 1. The CPU 30 is the system center for executing the start/status display of the system, sending a picking up signal, control of the optical system unit 16 or power supply board 18, and various processing operations according to programs stored in the flash ROM 34: optical pattern processing, seal number read processing, and comparison processing, automatically or in accordance with instructions input from an operation key unit 72 through the operation key interface 38.

The RAM 32 is a storage medium used as an edit memory or a work memory. Under the control of the CPU 30, the RAM 32 stores an image or seal number pattern obtained by picking up the image of the end face 3 of the optical fiber seal, i.e., a digitized optical pattern in correspondence with supplementary data such as a facility code number.

The flash ROM 34 is a storage medium for storing various programs for optical pattern processing associated with the optical pattern obtained by picking up the optical fiber seal, seal number read processing of reading the seal number from the seal number pattern, and comparison processing of comparing the optical pattern in sealing and that obtained by picking up in verification, character data used to display characters on a display LCD (to be described later), or various setting programs. The programs and data stored in the flash ROM 34 are transferred to the RAM 32 or the like and used under the control of the CPU 30.

In this embodiment, a ROM is used to protect programs. However, the program contents can be rewritten using the RAM card 24 as needed.

The memory battery 36 is a backup power supply which allows the RAM 32 to maintain the stored data even after the main power supply of the optical fiber seal verifying system 1 is turned off.

The clock IC 37 is a circuit for generating a clock signal for controlling the operation of the system including the CPU 30.

The operation key interface 38 is an interface for notifying the CPU 30 of information input by operating the operation key unit 72. Examples of information input to the system are information associated with the verifying operation, a command for instructing operation to be executed by the system, and an arbitrary comment input from the inspector or the like. The operation key unit 72 has a plurality of, e.g., eight keys and is used by the inspector to input various information to the system.

The LCD controller 39 controls display on a display LCD 70 under the control of the CPU 30. The display LCD 70 displays the system status, necessary operations, the input window, input data, or evaluation results.

The CCD control board 12 controls the function of the optical system unit 16 to pick up images of the end face of the optical fiber seal and detect the optical pattern and has an image memory 40, an analog/digital converter 42, and a CPU interface 44.

The image memory 40 temporarily stores the data of an optical pattern and seal number pattern of one frame, which are picked up by the optical system unit 16 and digitized. The stored data is transferred to the RAM 32 of the CPU board 10 in accordance with an instruction from the CPU 30.

The analog/digital converter 42 converts image signals associated with the optical pattern and seal number pattern obtained by picking up the image of the end face of the optical fiber seal and sent from a CCD camera board 54 of the optical system unit 16, i.e., NTSC (National Television System Committee) signals with analog values into digital signals to allow processing by the CPU 30, and stores the digital signals in the image memory 40.

The CPU interface 44 actuates an LED board 52 and CCD camera board 54 of the optical system unit 16 for a required time and outputs image signals associated with the optical pattern and seal number pattern of the optical fiber seal to the analog/digital converter 42 in accordance with an instruction from the CPU 30.

The memory card board 14 controls data transmission/reception to/from the RAM card 24 which is attached to the optical fiber seal verifying system main unit 1 as needed, and has a memory card interface 45.

The memory card interface 45 is connected to the RAM card 24 as needed. The memory card interface 45 is an input/output device for controlling read of data stored in the RAM card 24 or data transfer between the RAM card 24 storing the data and the CPU 30 under the control of the CPU 30.

The optical system unit 16 is used to pick up the images of the end face 3 of the optical fiber seal and input the optical pattern and seal number pattern and comprises a holder 50, the LED board 52, and the CCD camera board 54.

Figures 7A, 7B:
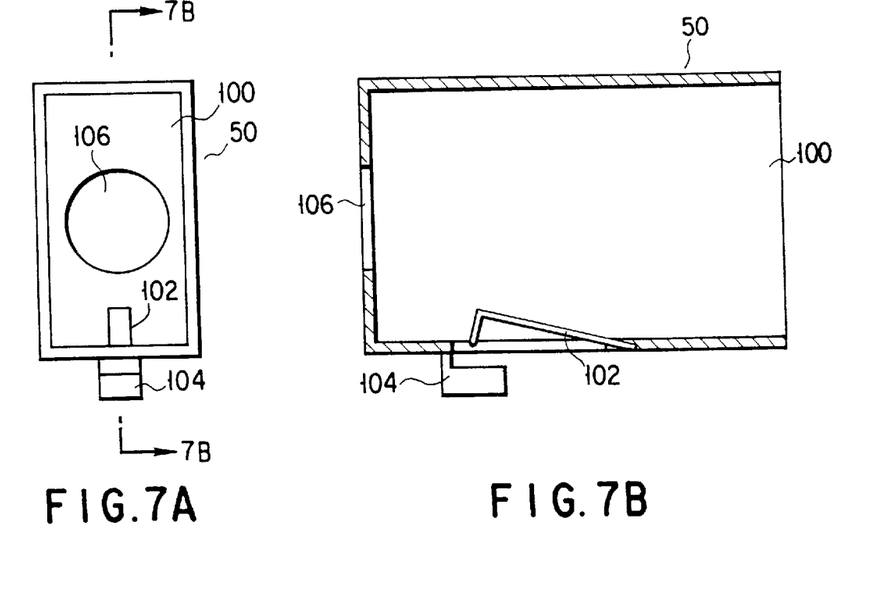
FIG. 7A is a front view of a holder.
FIG. 7B is a sectional view of a holder along a line 7B—7B of FIG. 7A.
Figure 8A:
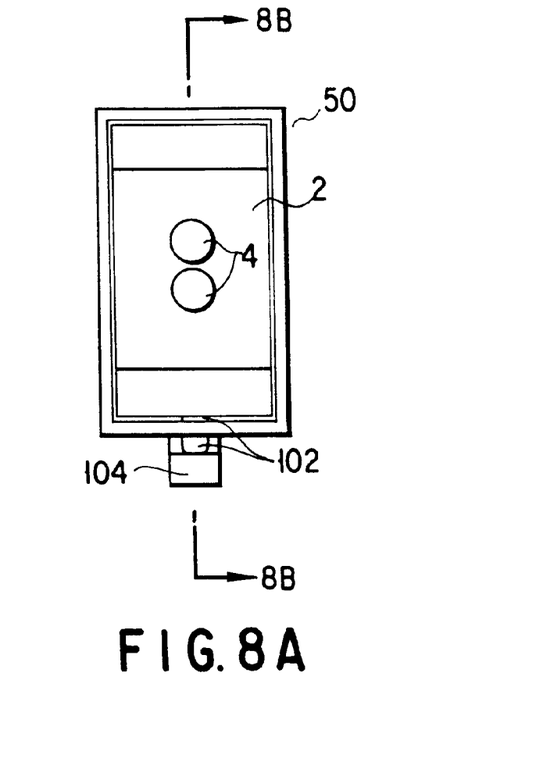
FIG. 8A is a front view of a holder holding a seal main body.
Figure 8B:
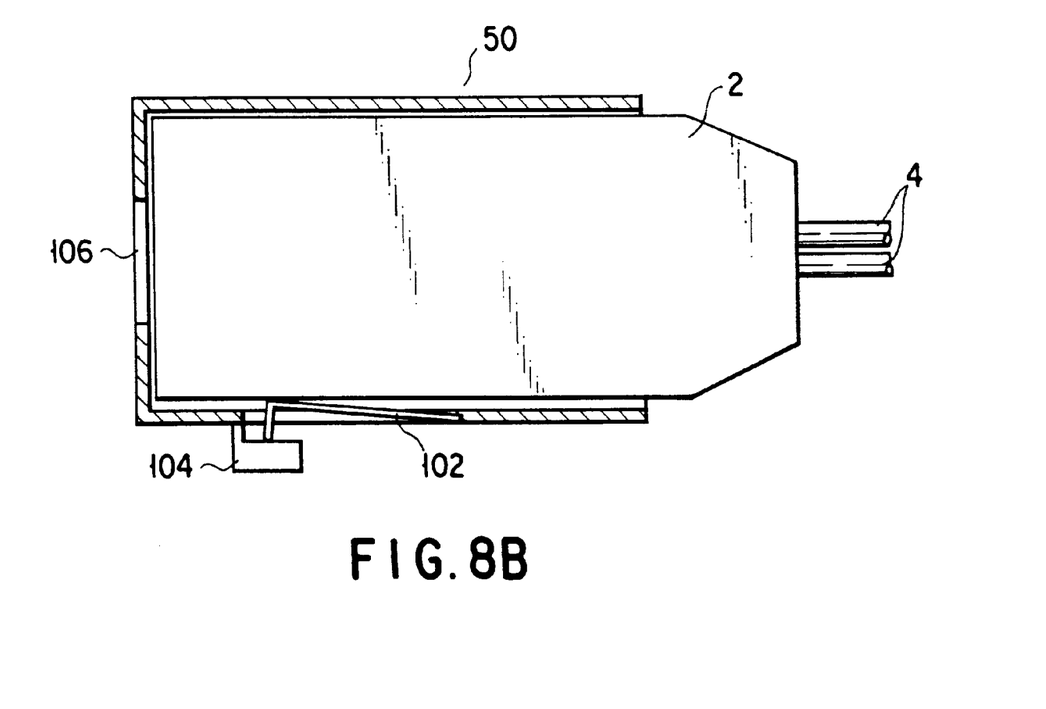
FIG. 8B is a sectional view of a holder holding a seal main body along a line 8B—8B of FIG. 8A.
Figure 9:
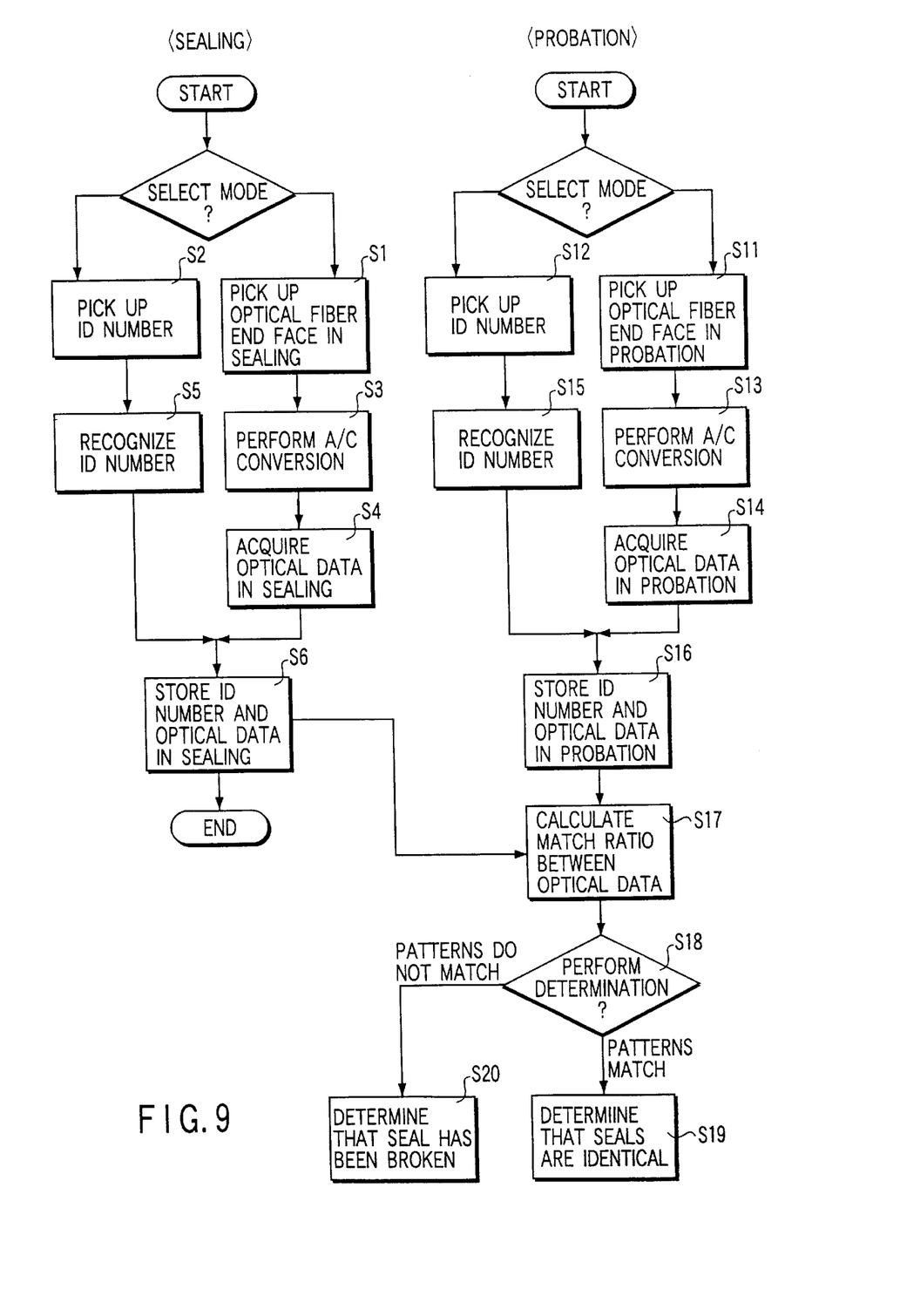
FIG. 9 is a flow chart showing the operation of the optical fiber seal verifying system according to the present invention.

As shown in FIG. 7A and FIG. 7B, the holder 50 is used to fix the seal main body 2 such that the end face 3 of the optical fiber seal to be probated can be picked up, and the optical pattern and seal number pattern of the optical fiber seal can be read. The holder 50 comprises an insertion portion 100 for receiving the seal main body 2, a fixing spring 102 for fixing the seal main body 2 inserted into the insertion portion 100, a limit switch 104 for detecting that the optical fiber end face 3 is inserted to a position where picking up the image is performed and a window 106 such that the end face 3 of the optical fiber seal can be picked up through it. As shown in FIG. 8A and FIG. 8B, when the optical fiber end face 3 is inserted to a predetermined position, the fixing spring 102 is brought in contact with the limit switch 104 since the fixing spring 102 is depressed by the seal main body 2.

Therefore, the limit switch 104 is turned on, and the image of the end face 3 can be picked up on the condition that the seal main body 2 is fixed by the repulsion force of the fixing spring 102.

The LED board 52 turns on a high-luminance LED (Light Emitting Diode) in accordance with in instruction from the CPU 30 to irradiate the end face 3 of the optical fiber seal with light, and the light enters the optical fiber end portion 5. The LED board 52 also illuminates the end face 3 of the optical fiber seal, thereby allowing the CCD camera on the CCD camera board 54 to read the seal number.

The CCD camera board 54 having a lens on its front surface picks up the images of the optical pattern and seal number pattern of the optical fiber seal with the CCD (Charge Coupled Device) camera and sends the images as NTSC signals to the CCD control board 12.

The power supply board 18 supplies power to the respective portions of the optical fiber seal verifying system 1. The power supply board 18 supplies power stored in the battery 20 or power obtained from an external AC power supply through the AC adapter 22 to the respective portions as stable power with a predetermined voltage.

The battery 20 is a rechargeable battery for storing power to be supplied to the respective portions of the optical fiber seal verifying system 1. The battery 20 is charged from an external AC power supply by a charger through the power supply board 18. When the optical fiber seal verifying system 1 is used as a stand-alone system, i.e., power is not obtained from an AC power supply through the AC adapter 22, the battery 20 is used to supply power to the respective portions of the optical fiber seal verifying system 1 under the control of the power supply board 18.

The AC adapter 22 is arranged independently of the verifying system main unit 1, and connected to the optical fiber seal verifying system main unit 1 as needed. When the optical fiber seal verifying system is to be operated by supplying power from an AC power supply, or the battery 20 is to be charged, the AC adapter 22 converts AC power of 100 to 240V into DC power of 8.4V and supplies the power to the power supply board 18.

Power supply is ON/OFF-controlled by a power supply key 80.

The RAM card 24 is attached to the memory card interface 45 of the optical fiber seal verifying system main unit 1 and used to store the data of an optical pattern picked up in sealing or optical pattern picking up in verification, or supply the stored data to the optical fiber seal verifying system 1.

Data stored in the RAM card 24 is also used to analyze the data more specifically or print the data using an independent personal computer.

Figure 3:
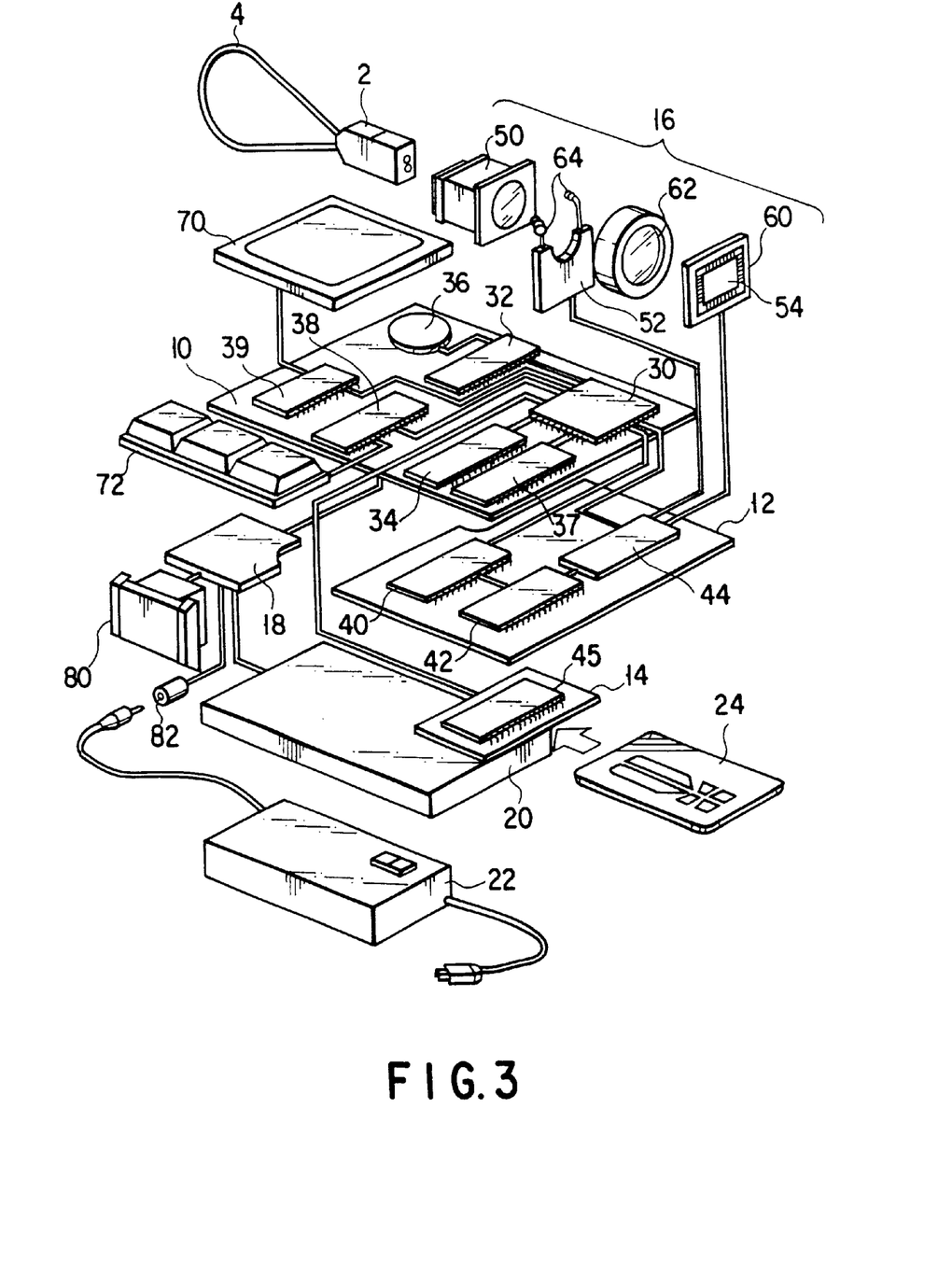
FIG. 3 is a developed perspective view of the optical fiber seal verifying system of the embodiment.

As shown in FIG. 3, the above-described CPU board 10, CCD control board 12, memory card board 14, battery 20, and the like are accommodated in a case to construct the optical fiber seal verifying system 1. Related components are connected to each board.

The optical system unit 16 connected to the CCD control board 12 has a CCD camera 60 mounted on the CCD camera board 54, a lens 62, an LED 64 mounted on the LED board 52, and the holder 50. The CCD camera 60, lens 62, LED 64, and holder 50 are located such that when the optical fiber seal is set in the holder 50, the end face 3 of the optical fiber seal, which is irradiated with light, can be picked up with the CCD camera 60 through the lens 62.

The display LCD 70 for displaying the system status, necessary operations, the input window, input data, or evaluation results, and the operation key unit 72 for inputting various information to the system are connected to the CPU board 10. Display on the display LCD 70 is controlled by an LCD controller 39 (LCDC 39) mounted on the CPU board 10.

The power supply key 80 and an AC adapter jack 82 are connected to the power supply board 18. The power supply key 80 is used to input an instruction for supplying power to the respective portions of the optical fiber seal verifying system to set the system in the operable state. The AC adapter jack 82 is used to connect the AC adapter 22.

Figure 4A:
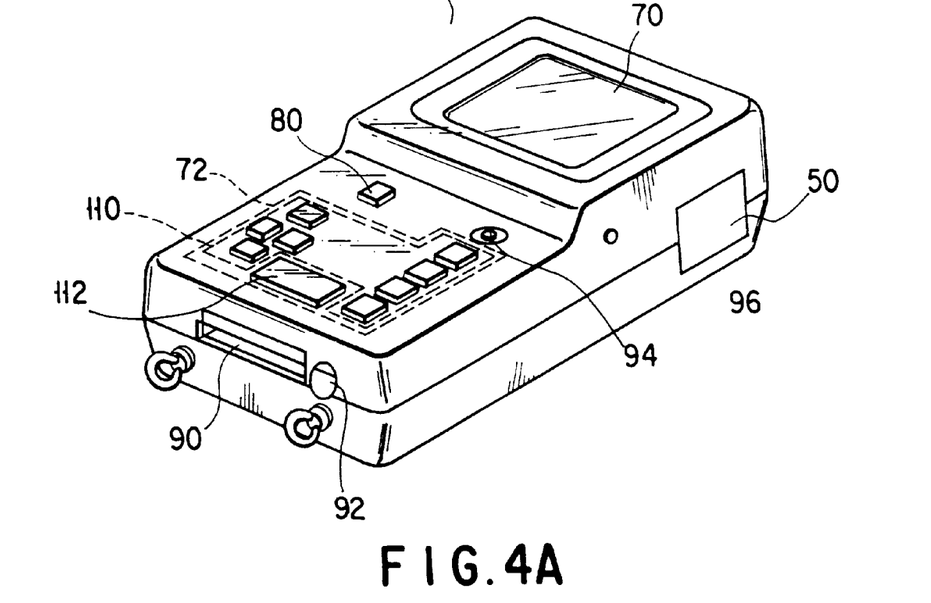
FIGS. 4A and 4B are perspective views respectively showing the front and rear surface portions of the optical fiber seal verifying stystem of the embodiment.
Figure 4B:
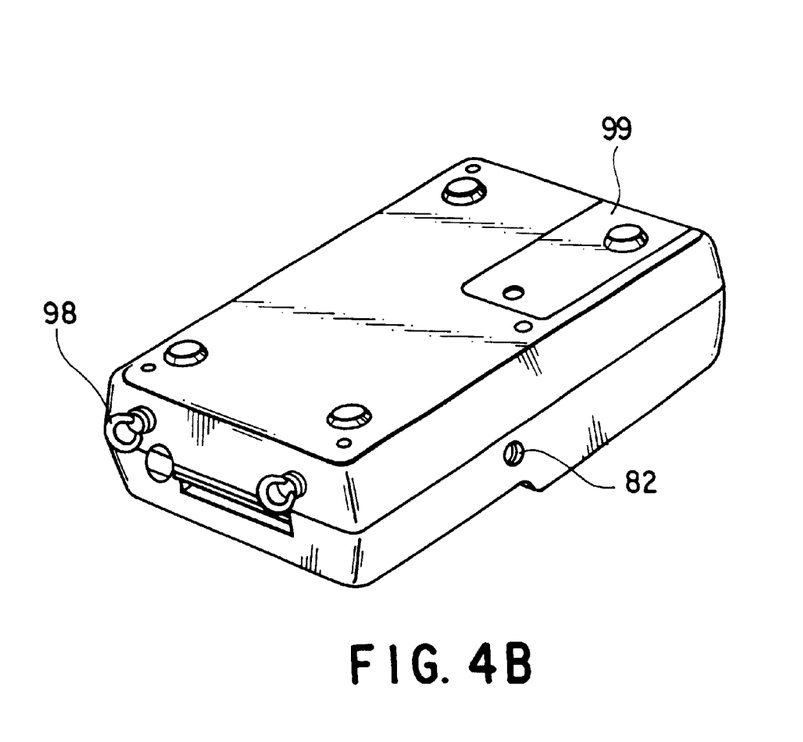

FIGS. 4A and 4B show the outer appearance of the optical fiber seal verifying system 1 of this embodiment. FIG. 4A shows the front surface portion of the case of the system main unit 1, and FIG. 4B shows the rear surface portion of the case of the system main unit 1.

As shown in FIG. 4A, not only the display LCD 70 but also various keys including the operation key unit 72 and power supply key 80, and an LCD backlight switch 94 for turning on/off the backlight of the display LCD 70 are mounted on the front surface portion of the case.

The operation key unit 72 also has an input key 110 for inputting data, and an OK key 112. Data input from the input key 110 is displayed on the display LCD 70, and the inspector can confirm it. If the inspector finds an error in the input data, correct data can be input from the input key 110 again. The inspector confirms that the input data has no error and then depresses the OK key 112, thereby completing the input.

A RAM card slot 90 for inserting the RAM card 24 into the optical fiber seal verifying system main unit 1 and a RAM card eject switch 92 for ejecting the RAM card 24 inserted in the RAM card slot 90 are provided on one side surface portion of the case shown in FIG. 4A. A contrast adjustment knob 96 for adjusting the contrast of the display LCD 70, and the holder 50 are provided on another side surface portion of the case.

As shown in FIG. 4B, a battery holder 99 is arranged on the rear surface portion of the case, so the battery 20 can be exchanged. The AC adapter jack 82, and a strap ring 98 used to put a strap on the optical fiber seal verifying system main unit 1 are disposed on a side surface portion of the case shown in FIG. 4B.

The operation of the optical fiber seal verifying system of this embodiment will be described next with reference to the flow chart shown in FIG. 8. The optical fiber seal verifying system is started by depressing the power supply key 80. The optical fiber seal verifying system can be operated as a stand-alone system using power stored in the battery 20. In addition, the optical fiber seal verifying system can be used as a stand-alone device at any verifying site such as an atomic facility because it is portable, as shown in FIGS. 4A and 4B.

The method of making an optical fiber seal will be described first. For an optical fiber seal, the optical fiber bundle 4 in the seal main body 2 is partially cut by the cutter and fixed in the main body. Because the optical fibers have a twist and some optical fibers are cut, the optical fiber seal has a unique optical pattern.

After sealing, the optical pattern in making the optical fiber seal and the pattern of a seal number carved in the optical fiber seal main body are recorded by the optical fiber seal verifying system.

To record the patterns, the optical fiber seal main body 2 is inserted from the end face side to a predetermined position in the holder 50. The limit switch 104 detects it and notifies the CPU 30 through the CPU interface 44 that the patterns can be read.

The CPU 30 causes, through the CPU interface 44, the LED 64 of the LED board 52 to irradiate the end face 3 of the optical fiber seal inserted into the holder 50 with light. The CPU 30 also instructs, through the CPU interface 44, the CCD camera 60 of the CCD camera board 54 to pick up the image of the end face 3 of the optical fiber seal (S1) and the seal number (S2) as shown in FIG. 8.

The CCD camera 60 picks up the image of the end face 3 of the optical fiber seal through the lens 62 and outputs the image signal to the analog/digital converter 42 of the CCD control board 12 through the CPU interface 44.

The analog/digital converter 42 converts the signal of the image picked up with the CCD camera 60 into a digital signal and stores it in the image memory 40. The analog/digital converter 42 converts the luminance information of the optical pattern into multivalued digital data (S3).

For the patterns obtained by picking up the image of the end face 3 of the optical fiber seal, which are stored in the image memory 40, the CPU 30 executes optical pattern processing associated with the optical pattern and seal number read processing of reading the contents of the seal number from the seal number pattern in accordance with programs stored in the flash ROM 34. The CPU 30 extracts the optical pattern region 120 and seal number region 122 from the patterns of the picked up image as shown in FIG. 6, which are stored in the image memory 40, and executes the following processing for the regions.

In optical pattern processing, data representing the optical pattern, i.e., comparison data used for comparison processing is generated on the basis of the digitized optical pattern data. In this embodiment, the average value of luminances across the optical pattern is obtained. On the basis of the average value, the luminous points as bright points formed by light transmitted through the optical fiber are recognized, the positions of luminous points are set, and luminance distribution data is generated. In addition, the barycenter position of all luminous points is calculated to generate comparison data (S4).

In seal number read processing, a character pattern is extracted from the seal number pattern, and character recognition processing is performed for the extracted character pattern, thereby reading alphabets and numbers representing the seal number. For this processing, general optical character recognition (OCR) can be used (S5).

In seal number read processing, if the seal number cannot be read by character recognition processing, data representing the seal number is input by operating the operation key unit 72.

The display LCD 70 displays according to the above-described processes under the control of the CPU 30 through the LCD controller 39. For example, when the image of the end face 3 of the optical fiber seal is picked up, and the image is stored in the image memory 40, the image pattern is displayed. When the seal number is read from the seal number pattern by seal number read processing, the read result is displayed.

For the seal number displayed on the display LCD 70, information indicating that the read result is correct can be input from the operation key unit 72. More specifically, when the seal number displayed on the display LCD 70 is correct, the inspector depresses a predetermined key of the operation key unit 72 to notify the CPU 30 of the confirmation information through the operation key interface 38. In response to this notification, the CPU 30 determines that the read result has been confirmed.

If the displayed seal number is incorrect, candidates obtained by character recognition in seal number read processing may be displayed on the LCD 70 to input a correct seal number by operating the operation key unit 72, or a correct seal number may be input from the operation key unit 72.

When the seal number is confirmed, the CPU 30 stores the seal number in correspondence with comparison data obtained from the corresponding optical pattern by optical pattern processing in the RAM card 24 through the memory card interface 45 (S6).

The comparison data need not always be stored in only the RAM card 24. It also may be stored in the RAM 32 backed up by the memory battery 36.

In the above-described way, the optical pattern obtained by picking up the end face 3 of each optical fiber seal used for sealing is converted into digital data as comparison data and stored in the RAM card 24. Assuming the storage capacity of the RAM card 24 is 2 Mbytes, data for optical patterns of 100 optical fiber seals can be stored.

The optical fiber seal verifying operation will be described next. In verification, an optical pattern (S11) and a seal number (S12) on the end face of an optical fiber seal to be probated are picked up by the same operation as in sealing. For the optical pattern, the image signal is converted into a digital signal by the analog/digital converter 42 (S13), as in sealing, and acquired as verification optical data (S14).

For the seal number as well, as in sealing, a character pattern is extracted from the seal number pattern, and character recognition processing is performed for the extracted character pattern, thereby reading alphabets and numbers representing the seal number (S15).

The obtained seal number and verification optical data are stored in the RAM card 24 as comparison data (S16).

The CPU 30 executes comparison processing of comparing the optical pattern obtained in verification with an optical pattern recorded in sealing. First, the CPU 30 searches a plurality of comparison data stored in sealing for a seal number on the basis of the seal number read from the optical fiber seal to be probated and obtains the same seal number. When the corresponding seal number is obtained, comparison optical pattern data stored in correspondence with this seal number is read out.

The CPU 30 compares the optical pattern in sealing and that in verification and calculates the concordance ratio. This processing is performed using the digital data of luminance distributions in sealing and verification, which are obtained from the picked up optical patterns through the analog/digital converter 42. More specifically, the luminance distribution data in sealing is fixed. A position where the luminance distribution data in verification matches that in sealing is searched for, and the concordance ratio is obtained at this position (S17).

Generally, letting N1 be the number of luminous points of the first optical pattern, N2 be the number of luminous points of the second optical pattern, and S be the number of luminous points at which the two optical patterns match, a concordance ratio A is given by $$A = S/(N1+N2-S) \qquad (1)$$

The optical pattern of each optical fiber seal is unique to the seal. If the seal is tampered with after sealing, the optical pattern in sealing changes to a different pattern and cannot be reproduced.

For an identical optical fiber seal which has not been tampered with, a high concordance ratio A is obtained. For a different optical fiber seal or an optical fiber seal which has been tampered with, a low concordance ratio A is obtained.

The CPU 30 determines the seal on the basis of the resultant concordance ratio A (S18). More specifically, when the concordance ratio A is equal to or higher than a set value, the CPU 30 determines that the seals are identical, and detects no tampering (S19). If the concordance ratio A is lower than the set value, the CPU 30 determines that the optical fiber seals are different, or the optical fiber seal has been tampered with, i.e., the seal has been broken (S20).

The battery 20 causes the display LCD 70, through the LCD controller 39, to display, e.g., a message representing whether the optical fiber seal has been illicitly broken. Hence, the inspector can confirm the verification result for the optical fiber seal.

The CPU 30 stores, through the memory card interface 45, the comparison result in correspondence with data associated with the optical pattern stored in the RAM card 24.

Data associated with the optical patterns and seal number patterns read from the optical fiber seal in sealing and verification, and the comparison result are stored in the RAM card 24. When the RAM card 24 is used in, e.g., a personal computer, more thorough examination or printing can be done using the stored data.

In the above-described embodiment, as comparison data, the luminance distribution data and the position of barycenter of all luminous points are obtained from the optical pattern picked up in sealing, and comparison is performed on the basis of these data. However, the optical pattern may be converted into another data representing the characteristic feature the optical pattern for comparison processing. Alternatively, instead of converting the optical pattern into another data form for comparison processing, comparison may be performed by pattern matching directly using an image pattern represented by multivalued data.

In use of the optical fiber seal verifying system of this embodiment, since an optical pattern is acquired by picking up the end face of an optical fiber seal at the verifying site and compared and collated with the optical pattern which has been recorded in advance in sealing, the verifying time can be largely shortened, and the operation load on the inspector can be reduced. Hence, cost reduction can be expected by suppressing an increase in number of inspectors due to a probable increase in inspection operations for nuclear facilities in the future.

In addition, since the optical pattern in sealing is compared with the optical pattern picked up in verification not visually but by comparison processing in the optical fiber seal verifying system, a verifying result free from the subjective point of view of the inspector can be obtained. Furthermore, pieces of information obtained from the optical fiber seal are converted into digital data, and the optical pattern, seal number pattern, and verifying result can be stored in the RAM card 24 or the like. This facilitates processing by a computer, and the reliability of verification can be improved by statistical processing.

Conventionally, optical fiber seals are rarely used because of a heavy load on the operator in verification, regardless of their advantage that the seals need not be detached in verification. However, since the optical fiber seal verifying system of the present invention facilitates the verifying operation, an increase in use of optical fiber seals is expected.

Since optical fiber seals can be probated many times without detaching them, an optical fiber seal can be objectively probated by a plurality of organizations including IAEA (International Atomic Energy Agency) or nations using the optical fiber seal verifying system of the present invention.

Additional advantages and modifications will readily occur to those skilled in the art. Therefore, the invention is its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical fiber seal verifying system comprising:

an optical pattern generation unit for reading an optical pattern of an optical fiber seal in sealing and verification and generating first and second optical pattern data corresponding to the sealing and verification, respectively;

a seal number input unit for inputting a unique seal number for identifying the optical fiber seal;

a memory unit for recording the optical pattern data generated by said optical pattern generation unit together with the seal number input by said seal number input unit;

a processor unit for reading the first optical pattern data recorded in said memory unit in verifying the optical fiber seal and the second optical pattern data recorded in said memory unit in sealing the optical fiber seal corresponding to the seal number on the basis of the seal number recorded in said memory unit and comparing the first and second optical pattern data with each other to calculate a concordance ratio; and a display unit for displaying a calculation result from said processor unit.

2. A system according to claim 1, further comprising a portable case accommodating said optical pattern generation unit, said seal number input unit, said memory unit, said processor unit, and said display unit, and a power supply unit accommodated in said case to supply power to all of said units.

3. A system according to claim 2, wherein said optical pattern generation unit comprises a holder for holding the optical fiber seal in which two end portions of an optical fiber bundle are fixed, a light-emitting device for sending light from one end face of the optical fiber bundle, and an image pickup device for picking up optical patterns of the optical fiber seal held by said holder and the seal number carved near an end portion of the optical fiber seal.

4. A system according to claim 3, wherein said optical pattern generation unit comprises an analog/digital converter for converting the optical patterns picked up by said image pick up device into multivalued digital data, and an image memory unit for storing the digital data converted by said analog/digital converter.

5. A system according to claim 4, wherein said processor unit calculates the number of luminous points and luminance distribution in two optical patterns of the optical fiber, which are represented by digital data generated by the analog/digital converter, the first optical pattern being one the fiber has while being probated and the second optical pattern being one the fiber has while being sealed, and said processor unit determines, from the number of luminous points and luminance distribution, positions which the two optical pattern need to take to have the greatest number of luminous points in common, and calculates a ratio of the number of luminous points which each pattern has in common with the to the other pattern to the number of other luminous points which the pattern has.

6. A system according to claim 5, wherein said processor unit calculates the concordance ratio by $$S/(N1+N2-S)$$

where N1 is the number of luminous points of a first optical pattern of the optical fiber seal in sealing, N2 is the number of luminous points of a second optical pattern of the optical fiber seal in verification, and S is the number of luminous points at which the first and second optical patterns match.

7. A system according to claim 6, wherein when the concordance ratio is equal to or higher than a predetermined value, said processor unit determines that the optical fiber seals are identical, and when the concordance ratio is lower than the predetermined value, said processor unit determines that the optical fiber seals are different, or the optical fiber seal has been broken.

8. A system according to claim 4, wherein said optical pattern generation unit performs pattern matching evaluation of optical patterns of optical fiber seals in sealing and verification, which are converted into digital data by said analog/digital converter, when the optical patterns match, determines that the optical fiber seals are identical, and when the optical patterns do not match, determines that the optical fiber seals are different, or the optical fiber seal has been broken.

9. A system according to claim 3, wherein said light-emitting device comprises a light-emitting diode, and said image pick up device comprises a CCD camera.

10. A system according to claim 3, wherein said holder comprises an insertion portion for receiving the optical fiber seal, a fixing spring for fixing the optical fiber seal inserted into said insertion portion, and a limit switch for detecting that the optical fiber seal is inserted to a position that allows picking up images.

11. A system according to claim 2, wherein said memory unit comprises an input/output device, and a portable storage medium freely attached/detached to/from said input/output device.

12. A system according to claim 11, wherein said input/output device comprises a plurality of operation keys.

13. A system according to claim 12, wherein said operation keys comprise an input key for inputting the seal number and a confirmation key for inputting the seal number to said memory unit when the seal number displayed on said display unit is correct, and wherein when the displayed seal number is correct, said confirmation key is depressed, and when the displayed seal number is incorrect, a seal number is input from said input key and confirmed by depression of said confirmation key to input the seal number.

14. A system according to claim 11, wherein the freely attached/detached portable storage medium comprises a RAM card.

15. A system according to claim 2, further comprising an emergency power supply unit for supplying power to said memory unit when the power supplied from said power supply unit is lost.

16. A system according to claim 2, wherein said display unit comprises a liquid crystal display device.

17. A system according to claim 2, wherein said display unit displays at least one of a processing status of an optical fiber seal verifying system main unit, information input to said input/output device, and the calculation result from said processor unit.

18. A system according to claim 2, wherein said optical pattern generation unit reads the optical pattern of the seal number and inputs the optical pattern to said seal number input unit, and said seal number input unit performs character recognition processing of the input optical pattern to recognize the seal number.

19. A system according to claim 18, wherein the seal number recognized by character recognition processing is displayed on said display unit.

20. A system according to claim 1, wherein said optical pattern generation unit comprises a holder for holding the optical fiber seal in which two end portions of an optical fiber bundle are fixed, a light-emitting device for sending light from one end face of the optical fiber bundle, and an image pick up device for picking up optical patterns of the optical fiber seal held by said holder and the seal number carved near an end portion of the optical fiber seal.

21. A system according to claim 20, wherein said optical pattern generation unit comprises an analog/digital converter for converting the optical patterns picked up by said image pick up device into multivalued digital data, and
   an image memory unit for storing the digital data converted by said analog/digital converter.

22. A system according to claim 21, wherein said processor unit calculates the number of luminous points and luminance distribution in two optical patterns of the optical fiber, which are represented by digital data generated by the analog/digital converter, the first optical pattern being one the fiber has while being probated and the second optical pattern being one the fiber has while being sealed, and said processor unit determines, from the number of luminous points and luminance distribution, positions which the two optical pattern need to take to have the greatest number of luminous points in common, and calculates a ratio of the number of luminous points which each pattern has in common with the to the other pattern to the number of other luminous points which the pattern has.

23. A system according to claim 22, wherein said processor unit calculates the concordance ratio by $$S/(N1+N2-S)$$

where N1 is the number of luminous points of a first optical pattern of the optical fiber seal in sealing, N2 is the number of luminous points of a second optical pattern of the optical fiber seal in verification, and S is the number of luminous points at which the first and second optical patterns match.

24. A system according to claim 23, wherein when the concordance ratio is equal to or higher than a predetermined value, said processor unit determines that the optical fiber seals are identical, and when the concordance ratio is lower than the predetermined value, said processor unit determines that the optical fiber seals are different, or the optical fiber seal has been broken.

25. A system according to claim 21, wherein said optical pattern generation unit performs pattern matching evaluation of optical patterns of optical fiber seals in sealing and verification, which are converted into digital data by said analog/digital converter, when the optical patterns match, determines that the optical fiber seals are identical, and when the optical patterns do not match, determines that the optical fiber seals are different, or the optical fiber seal has been broken.

26. A system according to claim 1, wherein said optical pattern generation unit reads the optical pattern of the seal number and inputs the optical pattern to said seal number input unit, and said seal number input unit performs character recognition processing of the input optical pattern to recognize the seal number.

27. A system according to claim 26, wherein the seal number recognized by character recognition processing is displayed on said display unit.

28. A system according to claim 1, wherein said memory unit comprises a RAM.

* * * * *